July 14, 1925.

W. K. ANDREW 1,545,995

THROTTLE VALVE MECHANISM

Filed Feb. 10, 1921

Inventor
William K. Andrew

Patented July 14, 1925.

1,545,995

UNITED STATES PATENT OFFICE.

WILLIAM K. ANDREW, OF MILWAUKEE, WISCONSIN.

THROTTLE-VALVE MECHANISM.

Application filed February 10, 1921. Serial No. 443,945.

*To all whom it may concern:*

Be it known that I, WILLIAM K. ANDREW, a citizen of the United States, and resident of Milwaukee, in the county of Milwaukee and State of Wisconsin, have invented certain new and useful Improvements in Throttle-Valve Mechanism; and I do hereby declare that the following is a full, clear, and exact description thereof.

This invention pertains to a throttle valve controlling mechanism and more especially to a valve in which both automatic and manual means are provided for its control.

The object of the invention is generally to provide automatic means for normally controlling the operation of the valve, and also to provide a manual control which may be readily and quickly adjusted, either to control the opening of the valve only or to control the movement of the valve in both directions, eliminating altogether the use of the automatic control.

A further object of the invention is to provide improved means for mounting the valve.

One practical embodiment of my invention is illustrated in the accompanying drawings in which, Figure 1 is a side elevation of the invention applied to the fuel inlet passage of an internal combustion engine.

Figure 1:
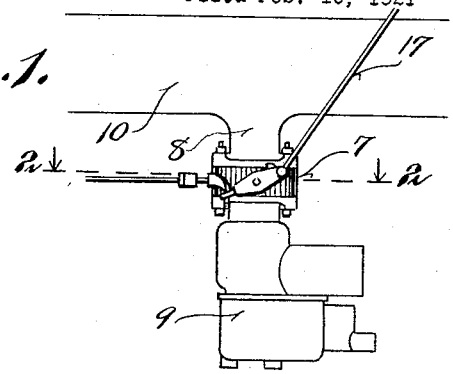
Figure 2:
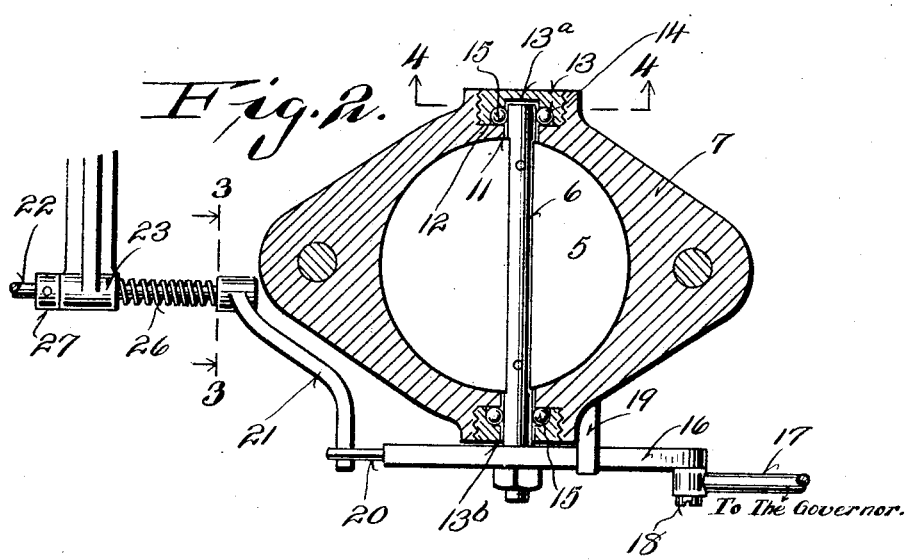
Figure 2 is a horizontal sectional view on the line 2—2 of Figure 1.

Referring more specifically to the drawings, 5 indicates a throttle valve which is mounted on the pin 6 which is rotatably mounted in the valve casing 7 in the fuel inlet passage 8 between the carburetor 9 and the inlet manifold 10. Horizontal aligned holes 11 are provided in the valve casing, the outer portions of the holes being enlarged to form annular shoulders 12. Plugs 13 are threaded into the enlarged portions and abut against the shoulders 12. The plugs are formed with recesses 13$^a$ and 13$^b$ respectively which register with the holes 11, the recess 13$^b$ being extended through the plug to allow the pin 6 to extend beyond the casing for the attachment of the control mechanism. Each recess is formed with an enlarged portion 14, which forms a ball race for the reception of the ball bearings 15.

The balls 15 are fitted in the enlarged portion 14 so as to completely occupy the outer portion thereof, and after the balls have been inserted in the ball race and the plug screwed in until it abuts the shoulder 12, the balls are effectively held against removal from the race.

The end of the pin 6 which extends outwardly of the recess 13$^b$ is provided with a cross-head 16, to one end of which is attached the throttle rod 17 by means of the screw 18. The other end of the throttle rod may be connected to the usual automatic governor. The opposite end 20 of the cross-head extends into the path of the rock arm 21, which is mounted upon the shaft 22, which may be manually rocked in the bearing 23. The outer end of the arm 21 is bifurcated, as shown at 24, and is also provided with a cutaway portion 25.

Figure 3:
Figure 3 is a detail sectional view on the line 3—3 of Figure 2.
Figure 4:
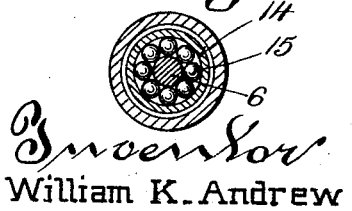
Figure 4 is a detail sectional view on the line 4—4 of Figure 2.

The end 20 of the cross-head is adapted to engage either the bifurcation 24 or the reduced portion 25. When the end 20 engages the reduced portion 25, as shown in Figure 3, it will be seen that the cross-head is free to be operated by the automatic governor through the rod 17. When, however, it is desired to open the throttle wider than the position at which the governor is set, the rod 22 is manually rocked so that the outer end of the arm 21 will raise the end 20 of the cross-head and open the throttle as far as may be desired. This is particularly advantageous when climbing a steep grade or at any time when there is an unusually heavy load on the engine.

It is often desirable, however, to operate the throttle altogether by manual control. For example, when the driver is stopping frequently and does not desire to stop his engine, the automatic governor would normally drive the engine at a higher speed than is economical. It is therefore desirable at such times to have the throttle entirely under manual control, so that the engine may run idly at barely sufficient speed to keep it running.

I have provided means by which the automatic control may be disconnected simply by removing the screw 18, and the arm 21 may be quickly adjusted so that the end 20 of the cross head will engage the bifurcation 24. The throttle may then be opened or closed by rocking the shaft 22 in one direction or the other.

In order to quickly adjust the arm 21, I have made the shaft 22 longitudinally slidable in the bearings 23, and between the arm 21 and the bearing 23 I have provided the coil spring 26 which normally holds the arm 21 in its outermost position with its end engaging the end of the cross-head. The shaft 22, however, may be manually moved against the pressure of the spring 26 and then the shaft 22 may be rocked to bring the bifurcation 24 opposite the end of the cross-head.

It will be seen therefore that in the normal operation of the governor, the throttle is automatically governed at the speed at which the governor is set, and the manual control is used only to increase the amount of fuel supplied. The automatic control may, however, be disconnected and the manual control adjusted quickly and readily whenever it is desired to do so.

I claim:

1. The combination of a throttle valve for the fuel intake of an internal combustion engine, a pin rigidly attached to said valve and adapted to rock said valve, a cross head rigidly attached intermediate its ends to said pin, a governor rod detachably connected to one end of said cross head, a manually operable rock shaft mounted at right angles to said pin, and having a laterally projecting arm and a projection carried by said cross head and located in the path of movement of said arm, whereby when said rock shaft is operated, said arm positively engages said projection and rocks said cross head irrespective of the action of the governor.

2. In combination with the throttle valve for the fuel intake of an internal combustion engine, a pin on which the valve is mounted, a cross-head carried by the pin, a governor rod detachably connected to one end of said cross-head, a manually operable rock shaft, a bifurcated arm thereon, said arm being normally engageable with the other end of said cross-head to open the throttle when the rock shaft is rocked, regardless of the position of the automatic throttle rod, a spring holding said rock shaft against longitudinal movement, but movable longitudinally in opposition to the spring out of the path of said cross-head whereby the bifurcated end may be adjusted to receive the end of the cross-head within the bifurcation or at one side thereof as desired.

In testimony that I claim the foregoing I have hereunto set my hand at Milwaukee, in the county of Milwaukee and State of Wisconsin.

WILLIAM K. ANDREW.